United States Patent
Müller et al.

(10) Patent No.: US 9,260,562 B2
(45) Date of Patent: Feb. 16, 2016

(54) METHOD FOR PRODUCING POLYCARBONATE POLYOLS BY THE IMMORTAL POLYMERIZATION OF CYCLIC CARBONATES

(75) Inventors: Thomas Ernst Müller, Aachen (DE); Christoph Gürtler, Köln (DE); Anthony Kermagoret, Moelan sur mer (FR); Yvonne Dienes, Hannover (DE); Igor Busygin, Mannheim (DE); Burkhard Köhler, Zierenberg (DE); Walter Leitner, Aachen (DE); Ganna Lyashenko, legal representative, Mannheim (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 101 days.

(21) Appl. No.: 13/880,288

(22) PCT Filed: Nov. 3, 2011

(86) PCT No.: PCT/EP2011/069348
§ 371 (c)(1),
(2), (4) Date: Sep. 27, 2013

(87) PCT Pub. No.: WO2012/059550
PCT Pub. Date: May 10, 2012

(65) Prior Publication Data
US 2014/0018517 A1    Jan. 16, 2014

(30) Foreign Application Priority Data
Nov. 4, 2010 (DE) .......................... 10 2010 043 409

(51) Int. Cl.
*C08G 64/00* (2006.01)
*C08G 64/30* (2006.01)
*C08G 64/02* (2006.01)
*C08G 64/18* (2006.01)
*C08G 64/38* (2006.01)
*C08G 75/00* (2006.01)

(52) U.S. Cl.
CPC .......... *C08G 64/305* (2013.01); *C08G 64/0208* (2013.01); *C08G 64/183* (2013.01); *C08G 64/38* (2013.01)

(58) Field of Classification Search
CPC ..................................................... C08G 64/183
USPC ................................................. 528/371, 372
See application file for complete search history.

(56) References Cited

U.S. PATENT DOCUMENTS

| | | | |
|---|---|---|---|
| 3,689,462 A * | 9/1972 | Maximovich | 528/371 |
| 6,646,100 B2 | 11/2003 | Hofmann et al. | |
| 2003/0032761 A1 | 2/2003 | Hofmann et al. | |
| 2006/0089252 A1 | 4/2006 | Coates et al. | |
| 2006/0223973 A1 | 10/2006 | Hinz et al. | |
| 2011/0230580 A1 * | 9/2011 | Allen et al. | 521/172 |

FOREIGN PATENT DOCUMENTS

| | | |
|---|---|---|
| CN | 1538981 A | 10/2004 |
| WO | 2010/028362 A1 | 3/2010 |

OTHER PUBLICATIONS

International Search Report of PCT/EP2011/069348 Mailed Feb. 22, 2012.

* cited by examiner

*Primary Examiner* — Terressa Boykin
(74) *Attorney, Agent, or Firm* — Miles & Stockbridge P.C.

(57) ABSTRACT

The invention relates to a process for the preparation of polycarbonate polyols, characterized in that cyclic carbonates are polymerized in the presence of DMC catalysts and chain-transfer agents consisting of polyether carbonate polyols.

14 Claims, No Drawings

METHOD FOR PRODUCING POLYCARBONATE POLYOLS BY THE IMMORTAL POLYMERIZATION OF CYCLIC CARBONATES

CROSS REFERENCE TO RELATED APPLICATIONS

This application is a §371 National Stage Application of PCT/EP2011/069348, filed Nov. 3, 2011, which claims priority to German Application No. 102010043409.4 filed Nov. 4, 2010.

BACKGROUND OF THE INVENTION

1. Field of the Invention

The invention relates to a process for the preparation of polycarbonate polyols by immortal polymerisation of cyclic carbonates in the presence of double metal cyanide catalysts (DMC catalysts) and chain-transfer agents consisting of polyether carbonate polyols.

2. Description of Related Art

An immortal polymerisation within the scope of the invention means a ring-opening polymerisation, wherein cyclic carbonate reacts in the presence of chain-transfer molecules with ring opening. The polymerisation is referred to as immortal when the polymerisation takes place, in the ideal case, without chain termination reactions and the number of macromolecules generated is equal to the number of chain-transfer molecules used. In an immortal polymerisation, the molecular weight of the macromolecules that are generated can be adjusted via the ratio of the number of monomer molecules used to the number of chain-transfer molecules. The functionality of the macromolecules that are generated is determined by the functionality of the chain-transfer molecules.

Polymer (1992), 33(9), 1941-1948 describes the living polymerisation of neopentyl glycol carbonate with tetraphenylporphyrin-aluminium complexes as catalyst. Because the reaction was carried out without the use of chain-transfer agents, the molecular weight of the macromolecules that are generated is determined by the number of catalyst molecules. A disadvantage is that the functionality of the macromolecules that are generated is not controlled. Other disadvantages are the sensitivity of the catalyst to traces of water, and the poor industrial availability of the catalyst.

Journal of Polymer Science, Part A (2000), 38(16), 2861-2871 describes the immortal polymerisation of epoxides, lactones and methacrylic acid esters with aluminium metalloporphyrins and episulfides with zinc metalloporphyrins. It is characterised by the use of protic compounds such as carboxylic acids and HCl as chain-transfer agent. The use of alcohols as chain-transfer agent is limited to epoxides and lactones, the catalysts that are used being sensitive to large amounts of alcohol groups and low molecular weight alcohols therefore being unsuitable as starter. Other disadvantages are the sensitivity of the catalyst to traces of water, and the poor industrial availability of the catalyst. Experimental details are not mentioned in the publication.

Macromolecules (2001), 34(18), 6196-6201 describes the immortal polymerisation of lactones and lactides with aluminium complexes as catalyst. The use of benzyl alcohol as a monofunctional chain-transfer molecule is a disadvantage. Other disadvantages are the sensitivity of the catalyst to traces of water, and the poor industrial availability of the catalyst.

Chemistry—A European Journal (2008), 14 (29), 8772-8775 describes the immortal polymerisation of trimethylene carbonate using benzyl alcohol as chain-transfer agent. The use of a monofunctional chain-transfer molecule is a disadvantage. Macromol. Rapid Commun (2009), 30, 2128-2135 describes the use of dihydroxy compounds as starter. A disadvantage in both works is the use of zinc-imidate complexes as catalysts, which are not readily available industrially and are sensitive to air, so that strict inertisation is necessary for the reaction.

EP-A 1859863 and DE-A 10108485 describe the conditioning of DMC (double metal cyanide) catalysts for the polymerisation of epoxides. It is a disadvantage that the catalysts in this reaction are sensitive to the large amounts of alcohol groups in the starters, and low molecular weight alcohols are therefore unsuitable as starter.

WO-A 03/014186 discloses the DMC-catalysed ring-opening homo- and co-polymerisation of cyclic carbonates, optionally in the presence of one or more starter compounds (chain-transfer agents), there being disclosed as chain-transfer agents inter alia polyether polyols and polyester polyols. Polyether carbonates as chain-transfer agents are not disclosed, however.

SUMMARY

The object of the present invention was to provide a process for the immortal polymerisation of cyclic carbonates, wherein the resulting polycarbonate polyol is distinguished by a molecular weight distribution that is not substantially broadened compared with that of the chain-transfer agent. In a preferred embodiment, the resulting polycarbonate polyol is to have a content of primary OH groups of at least 80%.

Surprisingly, it has now been found that cyclic carbonates can be polymerised in an immortal polymerisation with DMC catalysts to polycarbonate polyols having a molecular weight distribution that is not substantially broadened compared with that of the chain-transfer agent, there being used as chain-transfer agent polyether carbonate polyols.

Accordingly, the invention provides a process for the preparation of polycarbonate polyols, characterised in that cyclic carbonate is polymerised in the presence of DMC catalyst and chain-transfer agent consisting of polyether carbonate polyols. There can be used as the chain-transfer agent a polyether carbonate polyol or mixtures of different polyether carbonate polyols. There can be used as the cyclic carbonate a cyclic carbonate or mixtures of different cyclic carbonates.

DETAILED DESCRIPTION OF A PREFERRED EMBODIMENT

The invention further provides polycarbonate polyols prepared by the process according to the invention. The polycarbonate polyols prepared by the process according to the invention comprise polyether groups and can therefore also be regarded as polyether carbonate polyols. In order to distinguish it from the chain-transfer agents used, the product obtained by the process according to the invention is referred to as polycarbonate polyol.

The weight ratio of chain-transfer agent used to cyclic carbonate used is preferably from 1:0.001 to 1:50, particularly preferably from 1:0.005 to 1:5 and most preferably from 1:0.005 to 1:1.

The process according to the invention is preferably carried out in the presence of from 10 to 2000 ppm DMC catalyst. The preferred reaction temperature is from 60 to 160° C., particularly preferably from 80 to 130° C. Reaction temperatures that are too high are disadvantageous because ether groups are then also formed with cleavage of $CO_2$.

The reaction time is generally from 1 to 48 hours, preferably from 2 to 24 hours, so that generally no more cyclic carbonate is present in the reaction mixture. Alternatively, the completeness of the conversion of the reaction is monitored and continued until no more cyclic carbonate is present in the reaction mixture. The progress of the reaction can be monitored, for example, by means of suitable analytical methods (e.g. IR, NMR spectroscopy, chromatographic methods after sample removal) or can be determined purely empirically by comparative tests.

The process according to the invention can be carried out in the presence or absence of an inert solvent, such as, for example, toluene, chlorobenzene, 1,2-dichloroethane, 1,2-dimethoxyethane or dioxane. The process according to the invention is preferably carried out in the absence of an inert solvent.

Cyclic carbonates within the scope of the invention are compounds of formulae (I) and (II)

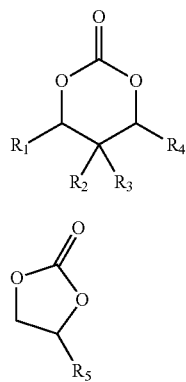

wherein
$R_1$, $R_4$ and $R_5$ independently of one another represent hydrogen or a linear or branched C1 to C12 alkyl radical or a C6 to C10 aryl radical, and
$R_2$ and $R_3$ independently of one another represent hydrogen or a linear or branched C1 to C12 alkyl radical or a C6 to C10 aryl radical or an allyloxymethyl radical.

Preferred compounds of formula (I) are trimethylene carbonate, neopentyl glycol carbonate, 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, TMP-monoallyl ether carbonate and pentaerythritol diallyl ether carbonate. Trimethylene carbonate and neopentyl glycol carbonate are particularly preferred.

Preferred compounds of formula (II) are ethylene carbonate, propylene carbonate and phenylethylene carbonate.

Compounds of formula (I) are most particularly preferred. These compounds have the advantage that, in the immortal polymerisation of the cyclic carbonates according to formula (I) in the presence of DMC catalyst and chain-transfer agents consisting of polyether carbonate polyols, ether groups are not formed or are formed in only a small amount with cleavage of $CO_2$.

In a most preferred embodiment of the invention, compounds of formula (I) wherein R1=R4=H or compounds of formula (II) wherein R5=H are used. Examples of formula (I) are trimethylene carbonate, neopentyl glycol carbonate and 2-methyl-1,3-propanediol carbonate. An example of formula (II) is ethylene carbonate. This has the advantage that, by the use of these cyclic carbonates, polycarbonates that contain primary OH groups as end groups are obtained.

DMC catalysts are known and described in U.S. Pat. No. 3,404,109, U.S. Pat. No. 3,829,505, U.S. Pat. No. 3,941,849 and U.S. Pat. No. 5,158,922. Improved DMC catalysts are described in U.S. Pat. No. 5,470,813, EP-A 700949, EP-A 743093, EP-A 761798, WO-A 97/40086, WO-A 98/16310 and WO-A 00/47649. Particular preference is given to the use of DMC catalysts according to EP-A 700949, which comprise, in addition to a double metal cyanide compound (e.g. zinc hexacyanocobaltate(III)) and an organic complex ligand (e.g. tert-butanol), also a polyether polyol having a number-average molecular weight greater than 500 g/mol. For the tests described in the examples, such a DMC catalyst comprising a polypropylene glycol having a number-average molecular weight of 1000 g/mol was used.

Polyether carbonate polyols are used as chain-transfer agent. Polyether carbonate polyols within the scope of the invention also comprise ether groups in addition to carbonate groups and are prepared, for example, by catalytic addition of alkylene oxides (epoxides) and carbon dioxide to H-functional starter substances (starters). This reaction is shown schematically in scheme (III), wherein R represents an organic radical such as alkyl, alkylaryl or aryl, each of which can also comprise heteroatoms such as, for example, O, S, Si, etc., and wherein n and m represent an integer, and wherein the product shown here in scheme (III) for the polyether carbonate polyol is simply to be so understood that blocks having the structure shown can in principle recur in the polyether carbonate polyol that is obtained, but the sequence, number and length of the blocks and the OH functionality of the starter can vary and are not limited to the polyether carbonate polyol shown in scheme (III). The cyclic carbonate (for example for $R=CH_3$ propylene carbonate) shown in scheme (III) is formed as a further product.

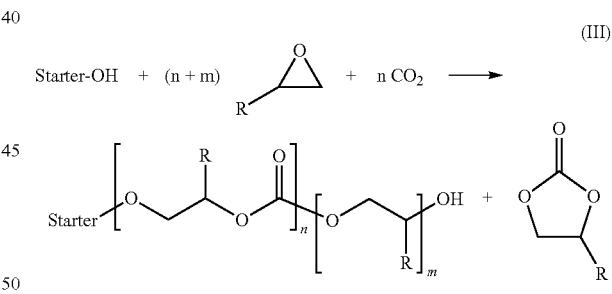

There are preferably used as chain-transfer agent polyether carbonate polyols which are prepared by the copolymerisation, catalysed by double metal cyanides (DMC catalysts), of carbon dioxide and alkylene oxides (such as, for example, propylene oxide, epichlorohydrin, styrene oxide, cyclohexene oxide or butene oxides) on H-functional starter substances (starters). Corresponding preparation processes are described, for example, in EP application number 10000511.5, WO-A 2008/013731 or US-A 20030149232.

Hydroxy-functional polycarbonates can additionally also be used as chain-transfer agents. Hydroxy-functional polycarbonates can be prepared, for example, by condensation of diols with open-chain dialkyl carbonates with cleavage of the alkyl alcohol. An alternative preparation method for hydroxy-functional polycarbonates comprises the catalytic addition of alkylene oxides (such as, for example, ethylene oxide, propylene oxide and/or butylene oxide) and carbon dioxide to H-functional starter substances (such as, for example, glycerol, propylene glycol and its higher homologues, ethylene glycol and its higher homologues), alkylene oxide and carbon dioxide being incorporated alternately. Generally, homogeneous zinc or cobalt catalysts are used for that purpose.

A particularly preferred embodiment of the invention is a process for the preparation of polycarbonate polyols, characterised in that (i) H-functional starter substance, or a mixture of at least two H-functional starter substances, is placed in a reaction vessel, and water and/or other readily volatile compounds are optionally removed ("drying"), wherein the DMC catalyst, the H-functional starter substance, or the mixture of at least two H-functional starter substances, are added before or after the drying, (ii) alkylene oxides and carbon dioxide are added to the mixture resulting from step (i) ("copolymerisation" with formation of the polyether carbonate polyol chain-transfer agent), (iii) to the mixture resulting from step (ii) (comprising DMC catalyst, polyether carbonate polyol and cyclic carbonate) there are added cyclic carbonate, which can be the same as or different from the cyclic carbonate contained in the mixture resulting from step (ii), and optionally (further) DMC catalyst (which can be the same as or different from the DMC catalyst used in step (i)), wherein the weight ratio of mixture resulting from step (ii) to added cyclic carbonate is from 1:0.001 to 1:50, particularly preferably from 1:0.005 to 1:5, most preferably from 1:0.005 to 1:1, and the resulting mixture is reacted at a temperature of from 60 to 160° C., particularly preferably from 80 to 130° C.

Step (i):

For the preparation of polyether carbonate polyols by catalytic addition of alkylene oxides (epoxides) and carbon dioxide to H-functional starter substances (starters) in the presence of the DMC catalysts according to the invention, the H-functional starter substance, or a mixture of at least two H-functional starter substances, is placed in a reaction vessel and water and/or other readily volatile compounds are optionally removed. This is carried out, for example, by stripping by means of nitrogen or carbon dioxide (optionally under reduced pressure) or by distillation in vacuo at temperatures of from 50 to 200° C., preferably from 80 to 160° C., particularly preferably at from 100 to 140° C. This pretreatment of the starter substance, or of the mixture of starter substances, is referred to in simplified terms as drying hereinbelow.

The DMC catalyst can already be present in the H-functional starter substance or the mixture of at least two H-functional starter substances. It is, however, also possible to add a dried DMC catalyst to the H-functional starter substance or to the mixture of H-functional starter substances after drying. The DMC catalyst can be added in solid form or in the form of a suspension in an H-functional starter substance. If the catalyst is added in the form of a suspension, it is preferably added before drying of the H-functional starter substance(s).

Step (i) is preferably followed by an activation step, wherein a partial amount (based on the total amount of the amount of alkylene oxides used in the copolymerisation) of one or more alkylene oxides is particularly preferably added to the mixture resulting from step (i), wherein this addition of the partial amount of alkylene oxide can take place in the presence or absence of $CO_2$ and wherein a waiting period is optionally observed until the temperature peak ("hotspot") that occurs as a result of the subsequent exothermic chemical reaction, and/or a pressure drop in the reactor occurs. The hotspot is more pronounced when the activation step is carried out in the absence of $CO_2$.

Step (ii):

The metered addition of one or more alkylene oxides and of the carbon dioxide can take place simultaneously or sequentially, it being possible for the entire amount of carbon dioxide to be added at once or in a metered manner over the reaction time. A metered addition of the carbon dioxide is preferably carried out. The metered addition of one or more alkylene oxides takes place simultaneously or sequentially with the metered addition of the carbon dioxide. If a plurality of alkylene oxides are used in the synthesis of the polyether carbonate polyols, then the metered addition thereof can take place simultaneously or sequentially via separate metered additions or via one or more metered additions, at least two alkylene oxides being metered in as a mixture. Via the nature of the metered addition of the alkylene oxides and of the carbon dioxide it is possible to synthesise random, alternating, block-like or gradient-like polyether carbonate polyols.

Preferably, an excess of carbon dioxide, based on the calculated amount of incorporated carbon dioxide in the polyether carbonate polyol, is used because an excess of carbon dioxide is advantageous due to the slowness of carbon dioxide to react. The amount of carbon dioxide can be established via the total pressure under the reaction conditions in question. The range from 0.01 to 120 bar, preferably from 0.1 to 110 bar, particularly preferably from 1 to 100 bar, has been found to be advantageous as the total pressure (absolute) for the copolymerisation for the preparation of the polyether carbonate polyols. For the process according to the invention it has further been shown that the copolymerisation for the preparation of the polyether carbonate polyols is advantageously carried out at from 50 to 150° C., preferably at from 60 to 145° C., particularly preferably at from 70 to 140° C. and most particularly preferably at from 90 to 110° C. If temperatures below 50° C. are set, the reaction comes to a halt. At temperatures above 150° C., the amount of undesirable secondary products increases considerably. It is further to be ensured that the $CO_2$ as far as possible changes from the gaseous state to the liquid and/or supercritical state under the chosen reaction conditions. $CO_2$ can, however, also be added to the reactor in the form of a solid and then change into the liquid and/or supercritical state under the chosen reaction conditions.

Preferred reactors for the preparation of the polyether carbonate polyols are tubular reactors, stirrer vessels and loop reactors. The addition of the alkylene oxide and of the $CO_2$ can take place, independently of one another, batchwise, semi-continuously (semi-batch) or continuously. For safety reasons, when using propylene oxide or ethylene oxide the content of free alkylene oxide should not exceed 15 wt. % in the reaction mixture of the stirrer vessel (see, for example, WO-A 2004/081082; page 3; line 14). Attention is therefore to be paid particularly to the metering rate of the epoxide both in semi-batch operation, where the product is not removed until the end of the reaction, and in continuous operation, where the product is removed continuously. The metering rate of the epoxide is to be so adjusted that the epoxide reacts completely sufficiently quickly despite the inhibiting effect of the carbon dioxide. It is possible to supply the carbon dioxide continuously or discontinuously. This depends on whether the epoxide is consumed quickly enough and whether the product is optionally to contain $CO_2$-free polyether blocks. The amount of carbon dioxide (indicated as pressure) can likewise vary during the addition of the epoxide. It is possible gradually to increase the $CO_2$ pressure during the addition of the epoxide or to lower it or leave it the same.

A further possible embodiment in the stirrer vessel is the continuous addition of the starter (continuous addition of starter; CAOS process). It is, however, not necessary to add the starter continuously or in portions. It can already be present in its entirety at the beginning of the reaction.

In general there can be used for the process according to the invention alkylene oxides having from 2 to 24 carbon atoms. The alkylene oxides having from 2 to 24 carbon atoms are, for example, one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidised fats as mono-, di- and tri-glycerides, epoxidised fatty acids, $C_1$-$C_{24}$-esters of epoxidised fatty acids, epichlorohydrin, glycidol and derivatives of glycidol such as, for example, methyl glycidyl ether, ethyl glycidyl ether, 2-ethylhexyl glycidyl ether, allyl glycidyl ether, glycidyl methacrylate and epoxide-functional alkyloxysilanes such as, for example, 3-glycidyloxypropyltrimethoxysilane, 3-glycidyloxypropyl-triethoxysilane, 3-glycidyloxypropyltripropoxysilane, 3-glycidyloxypropyl-methyl-dimethoxysilane, 3-glycidyloxypropyl-ethyldiethoxysilane, 3-glycidyloxypropyltriisopropoxysilane. There are preferably used as alkylene oxides ethylene oxide and/or propylene oxide, in particular propylene oxide.

There can be used as the suitable H-functional starter substance (also referred to as "starter") compounds having hydrogen atoms active for the alkoxylation. Groups active for the alkoxylation having active hydrogen atoms are, for example, —OH, —NH$_2$ (primary amines), —NH— (secondary amines), —SH and —CO$_2$H; —OH and —NH$_2$ are preferred, and —OH is particularly preferred. There is used as the H-functional starter substance, for example, one or more compounds selected from the group comprising water, mono- or poly-hydric alcohols, mono- or poly-valent amines, polyvalent thiols, carboxylic acids, amino alcohols, aminocarboxylic acids, thioalcohols, hydroxy esters, polyether polyols, polyester polyols, polyester ether polyols, polyether carbonate polyols, polycarbonate polyols, polyethyleneimines, polyetheramines (e.g. so-called Jeffamine® from Huntsman, such as, for example, D-230, D-400, D-2000, T-403, T-3000, T-5000 or corresponding products from BASF, such as, for example, Polyetheramine D230, D400, D200, T403, T5000), polytetrahydrofurans (e.g. PolyTHF® from BASF, such as, for example, PolyTHF® 250, 650S, 1000, 10005, 1400, 1800, 2000), polytetrahydrofuranamines (BASF product Polytetrahydrofuranamine 1700), polyether thiols, polyacrylate polyols, castor oil, the mono- or di-glyceride of ricinoleic acid, monoglycerides of fatty acids, chemically modified mono-, di- and/or tri-glycerides of fatty acids, and $C_1$-$C_{24}$-alkyl fatty acid esters which contain on average at least 2 OH groups per molecule. The $C_1$-$C_{24}$-alkyl fatty acid esters containing on average at least 2 OH groups per molecule are, for example, commercial products such as Lupranol Balance® (BASF SE), Merginol® types (Hobum Oleochemicals GmbH), Sovermol® types (Cognis Deutschland GmbH & Co. KG) and Soyol®TM types (USSC Co.).

There can be used as monofunctional starter compounds alcohols, amines, thiols and carboxylic acids. There can be used as monofunctional alcohols: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-Butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. There are suitable as monofunctional amines: butylamine, tert-butylamine, pentylamine, hexylamine, aniline, aziridine, pyrrolidine, piperidine, morpholine. There can be used as monofunctional thiols: ethanethiol, 1-propanethiol, 2-propanethiol, 1-butanethiol, 3-methyl-1-butanethiol, 2-butene-1-thiol, thiophenol. There may be mentioned as monofunctional carboxylic acids: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol; 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalised fats and oils, in particular castor oil), as well as all modification products of the alcohols mentioned above with differing amounts of ε-caprolactone.

The H-functional starter substances can also be selected from the substance class of the polyether polyols, in particular those having a molecular weight Mn in the range from 100 to 4000 g/mol. Preference is given to polyether polyols which are composed of repeating ethylene oxide and propylene oxide units, preferably with a content of from 35 to 100% propylene oxide units, particularly preferably with a content of from 50 to 100% propylene oxide units. They can be random copolymers, gradient copolymers, alternating or block copolymers of ethylene oxide and propylene oxide. Suitable polyether polyols composed of repeating propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (such as, for example, Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® 5180). Further suitable homo-polyethylene oxides are, for example, the Pluriol® E brands from BASF SE, suitable homo-polypropylene oxides are, for example, the Pluriol® P brands from BASF SE, suitable mixed copolymers of ethylene oxide and propylene oxide are, for example, the Pluronic® PE or Pluriol® RPE brands from BASF SE.

The H-functional starter substances can also be selected from the substance class of the polyester polyols, in particular those having a molecular weight Mn in the range from 200 to 4500 g/mol. There are used as polyester polyols at least difunctional polyesters. Polyester polyols preferably consist of alternating acid and alcohol units. There are used as acid components, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the mentioned acids and/or anhydrides. There are used as alcohol components, for example, ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol, trimethylolpropane, glycerol, pentaerythritol or mixtures of the mentioned alcohols. If dihydric or polyhydric polyether polyols are used as the alcohol component, polyester ether polyols which can likewise be used as starter substances for the preparation of the polyether carbonate polyols are obtained. Polyether polyols with Mn=from 150 to 2000 g/mol are preferably used for the preparation of the polyester ether polyols.

There can further be used as H-functional starter substances polycarbonate diols, in particular those having a molecular weight Mn in the range from 150 to 4500 g/mol, preferably from 500 to 2500 g/mol, which are prepared, for example, by reaction of phosgene, dimethyl carbonate, diethyl carbonate or diphenyl carbonate and difunctional alcohols or polyester polyols or polyether polyols. Examples of polycarbonates will be found, for example, in EP-A 1359177. For example, there can be used as polycarbonate diols the Desmophen® C types from Bayer MaterialScience AG, such as, for example, Desmophen® C 1100 or Desmophen® C 2200.

In a further embodiment of the invention, polyether carbonate polyols can be used as H-functional starter substances.

The H-functional starter substances generally have a functionality (i.e. number of H atoms active for the polymerisation per molecule) of from 1 to 8, preferably 2 or 3. The H-functional starter substances are used either individually or in the form of a mixture of at least two H-functional starter substances.

Preferred H-functional starter substances are alcohols of the general formula (IV)

HO—(CH$_2$)$_x$—OH   (IV)

wherein x is a number from 1 to 20, preferably an even number from 2 to 20. Examples of alcohols according to formula (IV) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (IV) with ε-caprolactone, for example reaction products of trimethylolpropane with ε-caprolactone, reaction products of glycerol with ε-caprolactone and reaction products of pentaerythritol with ε-caprolactone. Further preferred as H-functional starter substances are water, diethylene glycol, dipropylene glycol, castor oil, sorbitol, and polyether polyols composed of repeating polyalkylene oxide units.

The H-functional starter substances are particularly preferably one or more compounds selected from the group comprising ethylene glycol, propylene glycol, 1,3-propanediol, 1,3-butanediol, 1,4-butanediol, 1,5-pentanediol, 2-methyl-propane-1,3-diol, neopentyl glycol, 1,6-hexanediol, 1,8-octanediol, diethylene glycol, dipropylene glycol, glycerol, trimethylolpropane, di- and tri-functional polyether polyols, wherein the polyether polyol is composed of a di- or tri-H-functional starter substance and propylene oxide or of a di- or tri-H-functional starter substance, propylene oxide and ethylene oxide. The polyether polyols preferably have a molecular weight Mn in the range from 62 to 4500 g/mol and a functionality of from 2 to 3, and in particular a molecular weight Mn in the range from 62 to 3000 g/mol and a functionality of from 2 to 3.

Step (iii):

DMC catalyst can be added in step (iii) in order to increase the concentration of DMC catalyst in the reaction mixture.

Preferably, however, no DMC catalyst is added in step (iii), because it has been found, surprisingly, that the polyether carbonate polyol chain-transfer agent resulting from step (ii) still contains DMC catalyst which has sufficient catalytic activity for the subsequent immortal polymerisation. The advantage of this embodiment is accordingly that the DMC catalyst required for the immortal polymerisation of the cyclic carbonates is already present in the chain-transfer agent.

Step (iii) is preferably carried out in the presence of from 10 to 2000 ppm DMC catalyst. The preferred reaction temperature is from 60 to 160° C., particularly preferably from 80 to 130° C. Reaction temperatures that are too high are disadvantageous because ether groups are then also formed with cleavage of CO$_2$.

The reaction time in step (iii) is generally from 1 to 48 hours, preferably from 2 to 24 hours, so that generally no more cyclic carbonate is present in the reaction mixture. Alternatively, the completeness of the conversion of the reaction according to step (iii) is monitored and continued until no more cyclic carbonate is present in the reaction mixture. The progress of the reaction can be monitored, for example, by means of suitable analytical methods (e.g. IR, NMR spectroscopy, chromatographic methods after sample removal) or can be determined purely empirically by comparative tests.

The process according to step (iii) can be carried out in the presence or absence of an inert solvent, such as, for example, toluene, chlorobenzene, 1,2-dichloroethane, 1,2-dimethoxyethane or dioxane. The process according to the invention is preferably carried out in the absence of an inert solvent.

In an alternative embodiment of the invention there is used as chain-transfer agent a polycarbonate polyol which has been prepared by the process of the present invention. Accordingly, it is a process for the preparation of polycarbonate polyols, characterised in that cyclic carbonate is polymerised in the presence of DMC catalyst and of polycarbonate polyol prepared by the process according to the invention (as chain-transfer agent). To that end, the polycarbonate used as chain-transfer agent and the cyclic carbonate are preferably used in a weight ratio of from 1:0.001 to 1:50, particularly preferably from 1:0.005 to 1:5, most preferably from 1:0.005 to 1:1. These polycarbonate polyols used as chain-transfer agent are prepared beforehand in a separate reaction step.

The process according to the invention permits access to polycarbonate polyols which have a molecular weight distribution that is not or is not substantially broadened compared with the chain-transfer agent and which are distinguished by a defined OH functionality. By suitably choosing the cyclic carbonate, the ratio between primary and secondary OH groups in the end group can be adjusted. If trimethylene carbonate, neopentyl glycol carbonate, 2-methyl-1,3-propanediol carbonate or ethylene carbonate is used as the cyclic carbonate, polycarbonate polyols that contain only primary OH groups as end groups are obtained.

In comparison with secondary OH groups, primary OH groups have a higher reactivity, for example in the reaction with isocyanates to urethane units. In the reaction of polyols with diisocyanates and/or polyisocyanates, this results in more rapid curing of the materials. Fields of use are the production of flexible foams, rigid foams, thermoplastic urethanes (TPUs), adhesives and also in surface-coating compositions and dispersions. Target sectors are inter alia the manufacturers of prepolymers and polyurethane materials.

The process according to the invention can be carried out without complex inert gas technology and proceeds quickly at moderate temperatures, and preferably without inert solvents, such as, for example, toluene, chlorobenzene, 1,2-dichloroethane, 1,2-dimethoxyethane or dioxane, being required. A high content of primary OH end groups can otherwise be achieved only by the use of ethylene oxide in the polyether carbonate preparation. The use of ethylene oxide is questionable, however, for reasons of safety in the workplace and toxicity. Under the reaction conditions of the polyether carbonate preparation, the DMC-catalysed secondary reaction between ethylene oxide and carbon dioxide to give cyclic ethylene carbonate is predominant in the presence of carbon dioxide.

EXAMPLES

The weight- and number-average molecular weight of the resulting polymers was determined by means of gel permeation chromatography (GPC). The procedure according to DIN 55672-1: "Gel permeation chromatography, Part 1—Tetrahydrofuran as elution solvent" was followed. Polystyrene samples of known molar mass were used for calibration.

The polydispersity is the ratio of the weight-average molecular weight to the number-average molecular weight. The polydispersity is used within the scope of the invention to assess the breadth of the molecular weight distribution, that is to say the higher the value of the polydispersity, the broader the molecular weight distribution.

The OH number was determined on the basis of DIN 53240-2, but N-methylpyrrolidone was used as solvent instead of THF/dichloromethane. Titration was carried out with 0.5 molar ethanolic KOH (end point recognition by means of potentiometry). Castor oil with certified OH number was used as test substance. The indication of the unit in "$mg_{KOH}/g$" refers to mg [KOH]/g [polyether carbonate polyol].

The ratio of propylene carbonate formed to polyether carbonate polyol was determined by means of NMR spectroscopy (Bruker, 400 Ultrashield, 400 MHz, 16 scans). The sample was dissolved in each case in deuterated chloroform. The relevant resonances in the $^1$H-NMR spectrum (based on TMS=0 ppm) are as follows:
  polyether polyol (ether units in the polymer without incorporated carbon dioxide): resonances at 1.11 to 1.17 ppm with area A, resonance area corresponds to 3H atoms,
  carbonate resulting from carbon dioxide incorporated in the polyether carbonate polyol: resonances at 1.25 to 1.32 ppm with area B, resonance area corresponds to 3H atoms,
  cyclic carbonate: resonance at 1.45-1.49 ppm with area C, resonance area corresponds to 3H atoms,
  unreacted propylene oxide: resonance at 2.95-2.99 ppm with area D, resonance area corresponds to one H atom,
  unreacted trimethylene carbonate: 4.46 and 2.15 ppm with areas E and F, resonance areas correspond to 4 and 2H atoms,
  trimethylene carbonate incorporated into the polymer: 4.24 and 2.05 ppm with areas G and H, resonance areas correspond to 4 and 2H atoms.

The amount of carbonate incorporated in the polymer in the reaction mixture is calculated as follows:

Taking into account the relative intensities, the amount of polymer-bonded carbonate ("linear carbonate" LC) in the reaction mixture was converted to mol % according to formula (V):

$$LC = \frac{B}{A+B} * 100\%. \tag{V}$$

The amount by weight (in wt. %) of polymer-bonded carbonate (LC') in the reaction mixture was calculated according to formula (VI):

$$LC' = \frac{B*102}{A*58 + B*102} * 100\%. \tag{VI}$$

The factor 102 results from the sum of the molar masses of $CO_2$ (molar mass 44 g/mol) and of propylene oxide (molar mass 58 g/mol), the factor 58 results from the molar mass of propylene oxide.

The amount (in mol %) of unreacted propylene oxide (PO) in the reaction mixture was calculated according to formula (VII):

$$PO = \frac{D}{A/3 + B/3 + C/3 + D} * 100\%. \tag{VII}$$

The amount (in mol %) of cyclic carbonate (CC') in the reaction mixture was calculated according to formula (VIII):

$$CC' = \frac{C/3}{A/3 + B/3 + C/3} * 100\%. \tag{VIII}$$

The amount (in mol %) of unreacted trimethylene carbonate (TMC) in the reaction mixture was calculated according to formula (IX):

$$TMC = \frac{E+F}{E+F+G+H} * 100\%. \tag{IX}$$

The $^{19}$F-NMR spectroscopic measurements for determining the ratio of primary to secondary OH groups were carried out according to Standard Test Method D 4273-05 (Appendix) of ASTM International. The signals for primary OH groups were observed in the range −75.23 to −75.33 ppm, the signals for secondary OH groups were observed at −75.48 to −75.57 ppm.

Example 1

(a) Preparation of a Polyether Carbonate Diol (Chain-Transfer Agent) by Copolymerisation of Propylene Oxide (PO) and $CO_2$ in the Presence of Polypropylene Glycol as Starter A mixture of 7.9 mg of DMC catalyst (prepared according to Example 6 of WO-A 01/80994) and 13.3 g of polypropylene glycol (starter, molecular weight 1000 g/mol) was placed in a 300 ml pressurised reactor and stirred (500 rpm) for 1 hour at 130° C. under a slight vacuum (50 mbar) and a light stream of argon. After application of a $CO_2$ pressure of 15 bar, 9.5 g of propylene oxide (PO) were metered in with the aid of an HPLC pump (1.0 ml/min) The reaction mixture was stirred for 15 minutes at 130° C. (stirring speed 500 $min^{-1}$). A further 33.0 g of PO were then metered in via an HPLC pump (1.0 ml/min). When the addition was complete, stirring was carried out for a further 3 hours at 130° C. A sample removed after that reaction time was studied by means of NMR spectroscopy. The mixture contained polyether carbonate containing 10.5 mol % carbonate units corresponding to 17.1 swt. % carbon dioxide, 0.1 mol % propylene oxide and 1.1 mol % cyclic propylene carbonate.

The low molecular weight constituents were removed from the mixture in a rotary evaporator, and a sample was studied by means of NMR spectroscopy. There were obtained 39.4 g of a mixture of polyether carbonate containing 10.8 mol % carbonate units, 0.0 mol % propylene oxide and 1.1 mol % cyclic propylene carbonate. By means of $^{19}F$ NMR spectroscopy, the ratio of primary to secondary OH groups was determined as 11.6/88.4. The polyether carbonate obtained had a molecular weight $M_n$=6520 g/mol, $M_w$=9530 g/mol and a polydispersity of 2.06. The OH number of the mixture obtained was 25.7 $mg_{KOH}$/g.

(b) Reaction of the Polyether Carbonate Diol Obtained from Stage a) with Trimethylene Carbonate (Immortal Ring Opening Polymerisation with DMC Catalyst)

A mixture of 10.5 g of DMC catalyst (prepared according to Example 6 of WO-A 01/80994), 20.1 g of polymer from Example 1 (a) and 20.1 g of trimethylene carbonate was placed in a 300 ml pressurised reactor and stirred (stirring speed 500 $min^{-1}$) for 30 minutes at 110° C. under reduced pressure (p=75 mbar) and a light stream of argon. An argon pressure of 1.5 bar was then applied, and stirring was carried out for 3 hours at 110° C.

The yield of the polymer mixture was quantitative. The NMR spectroscopic study of the reaction mixture showed complete conversion of the trimethylene carbonate. By means of $^{19}F$ NMR spectroscopy, the ratio of primary to secondary OH groups was determined as 82.8/17.2. The polyether carbonate obtained had a molecular weight $M_n$=12,780 g/mol, $M_w$=18,720 g/mol and a polydispersity of 1.46. The OH number of the mixture obtained was 16.8 $mg_{KOH}$/g.

Example 2

(a) Preparation of a Polyether Carbonate Triol (Chain-Transfer Agent) by Copolymerisation of Propylene Oxide (PO) and $CO_2$ in the Presence of Polypropylene Triol as Starter A mixture of 8.1 mg of DMC catalyst (prepared according to Example 6 of WO-A 01/80994) and 8.5 g of Arcol Polyol 1110 (starter, molecular weight 700 g/mol, functionality 3, OH number 235 $mg_{KOH}$/g) was placed in a 300 ml pressurised reactor and stirred (500 rpm) for 1 hour at 130° C. under a slight vacuum (50 mbar) and a light stream of argon. After application of a $CO_2$ pressure of 15 bar, 9.5 g of propylene oxide (PO) were metered in with the aid of an HPLC pump (1.0 ml/min) The reaction mixture was stirred for 15 minutes at 130° C. (stirring speed 500 $min^{-1}$) A further 33.0 g of PO were then metered in via an HPLC pump (1.0 ml/min) When the addition was complete, stirring was carried out for a further 3 hours at 130° C. A sample removed after that reaction time was studied by means of NMR spectroscopy. There was obtained a mixture of polyether carbonate containing 8.8 mol % carbonate units corresponding to 14.5 wt. % carbon dioxide, no unreacted propylene oxide and 1.3 mol % cyclic propylene carbonate.

The low molecular weight constituents were removed from the mixture in a rotary evaporator, and a sample was studied by means of NMR spectroscopy. There were obtained 38.9 g of a mixture of polyether carbonate containing 10.9 mol % carbonate units, no unreacted propylene oxide and 1.5 mol % cyclic propylene carbonate. By means of $^{19}F$ NMR spectroscopy, the ratio of primary to secondary OH groups was determined as 11.7/88.3. The polyether carbonate obtained had a molecular weight $M_n$=5620 g/mol, $M_w$=7340 g/mol and a polydispersity of 1.31. The OH number of the mixture obtained was 40.0 $mg_{KOH}$/g.

(b) Reaction of the Polyether Carbonate Triol Obtained from Stage a) with Trimethylene Carbonate (Immortal Ring-Opening Polymerisation with DMC Catalyst)

A mixture of 10.3 g of DMC catalyst (prepared according to Example 6 of WO-A 01/80994), 20.2 g of polymer from Example 1 (a) and 20.1 g of trimethylene carbonate was placed in a 300 ml pressurised reactor and stirred (stirring speed 500 $min^{-1}$) for 30 minutes at 110° C. under reduced pressure (p=75 mbar) and a light stream of argon. An argon pressure of 2.1 bar was then applied, and stirring was carried out for 3 hours at 110° C.

The yield of the polymer mixture was quantitative. The NMR spectroscopic study of the reaction mixture gave 78.2% conversion of trimethylene carbonate. By means of $^{19}F$ NMR spectroscopy, the ratio of primary to secondary OH groups was determined as 79.8/20.2. The polyether carbonate obtained had a molecular weight $M_n$=11,600 g/mol, $M_w$=18,630 g/mol and a polydispersity of 1.61. The OH number of the mixture obtained was 21.6 $mg_{KOH}$/g.

The invention claimed is:

1. A process for preparing a polycarbonate polyol, comprising polymerizing cyclic carbonate in the presence of DMC catalyst and chain-transfer agent, wherein the chain-transfer agent consists of polyether carbonate polyol and is prepared beforehand in a separate reaction step.

2. The process according to claim 1, wherein the cyclic carbonate is at least one compound selected from the group consisting of compounds of formulae (I) and (II)

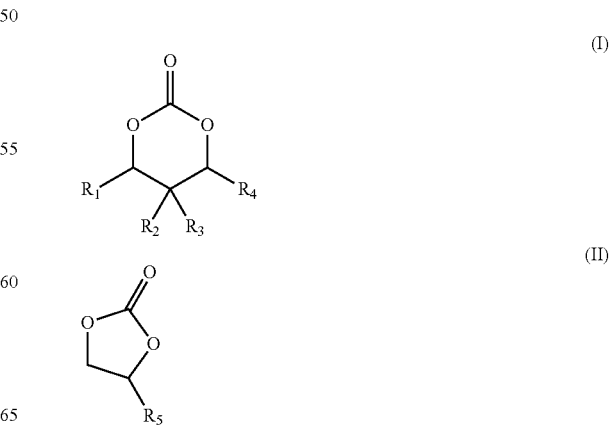

wherein
- R1, R4 and R5 independently of one another represent hydrogen or a linear or branched C1 to C12 alkyl radical or a C6 to C10 aryl radical, and
- R2 and R3 independently of one another represent hydrogen or a linear or branched C1 to C12 alkyl radical or a C6 to C10 aryl radical or an allyloxymethyl radical.

3. The process according to claim 1, wherein the cyclic carbonate is at least one selected from the group consisting of trimethylene carbonate, neopentyl glycol carbonate, 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, TMP-monoallyl ether carbonate, pentaerythritol diallyl ether carbonate, propylene carbonate, phenylethylene carbonate and ethylene carbonate.

4. The process according to claim 1, wherein the DMC catalyst comprises zinc hexacyanocobaltate(III) which comprises as organic complex ligands tert-butanol and a polyether polyol having a number-average molecular weight of at least 500 g/mol.

5. The process according to claim 1, wherein trimethylene carbonate is used as the cyclic carbonate.

6. The process according to claim 1, wherein polymerisation of the cyclic carbonate takes place in the presence of DMC catalyst and at least one chain-transfer agent at a reaction temperature of from 60 to 160° C.

7. The process according to claim 1, wherein the weight ratio of chain-transfer agent to cyclic carbonate is from 1:0.001 to 1:50.

8. The process according to claim 1, wherein
  (i) H-functional starter substance, or a mixture of at least two H-functional starter substances, is placed in a reaction vessel, and water and/or other readily volatile compounds are optionally removed by drying, wherein the DMC catalyst, the H-functional starter substance, or the mixture of at least two H-functional starter substances, are added before and/or after the drying,
  (ii) an alkylene oxide and carbon dioxide are added to the mixture resulting from (i) thereby comprising copolymerisation with formation of the polyether carbonate polyol chain-transfer agent,
  (iii) to the mixture resulting from (ii), there is added a cyclic carbonate, which can be the same as or different from the cyclic carbonate contained in the mixture resulting from (ii), wherein the weight ratio of mixture resulting from (ii) to added cyclic carbonate is from 1:0.001 to 1:50, and a resulting mixture is reacted at a temperature of from 60 to 160° C.

9. The process according to claim 8, wherein no DMC catalyst is added in (iii).

10. The process according to claim 1, wherein there is used as the chain-transfer agent a polycarbonate which has been prepared by said process.

11. An aliphatic polycarbonate obtainable by a process according to claim 1.

12. The process according to claim 1, wherein the polycarbonate polyol has a content of primary OH groups of at least 80%.

13. The process according to claim 1, wherein the chain-transfer agent consists of a mixture of different polyether carbonate polyols.

14. The process according to claim 1, further comprising reacting the polycarbonate polyol with a diisocyanate and/or polyisocyanate to form a polyurethane.

* * * * *